United States Patent

[11] 3,626,411

| [72] | Inventor | George B. Litchford<br>32 Cherry Lawn Lane, Northport, N.Y.<br>11768 |
|---|---|---|
| [21] | Appl. No. | 844,055 |
| [22] | Filed | July 23, 1969 |
| [45] | Patented | Dec. 7, 1971 |

[54] PROXIMITY INDICATOR SYSTEMS USING TRANSPONDERS
3 Claims, 5 Drawing Figs.

[52] U.S. Cl. .................................................. 343/6 R,
343/6.5 R, 343/112 CA
[51] Int. Cl. ................................................... G01s 9/56
[50] Field of Search............................................. 343/6 R,
6.5 R, 112 CA

[56] References Cited
UNITED STATES PATENTS
3,550,129  12/1970  Steele............................ 343/112 CA

*Primary Examiner*—T. H. Tubbesing
*Attorney*—Henry Huff

ABSTRACT: Mobile craft carrying radio repeaters or transponder beacons, which transmit in response to signals received from an initiating transmitter at a reference location, are arranged to receive also the responses from other similarly equipped craft. The time interval between reception of an initiating transmission and reception of the response from another craft affords an indication of the proximity of said other craft. The initiating transmitter may be a scanning device, such as a surveillance radar. Further resolution of the positional relationship between mobile craft can be provided by use of a plurality of differently located initiating transmitters.

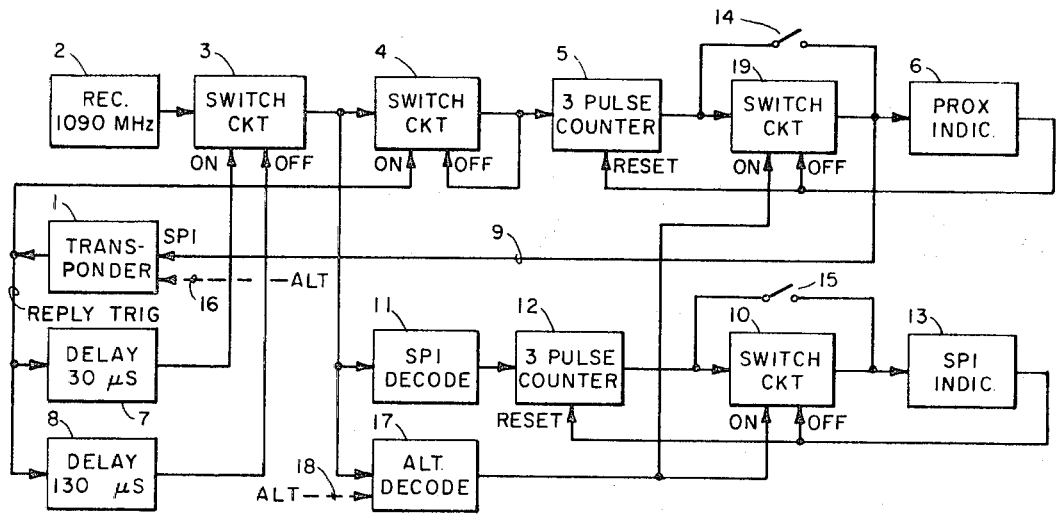
Fig. 1.
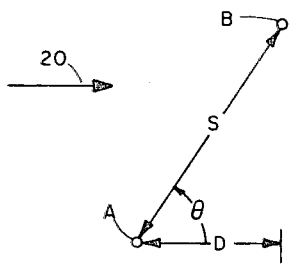
Fig. 2.
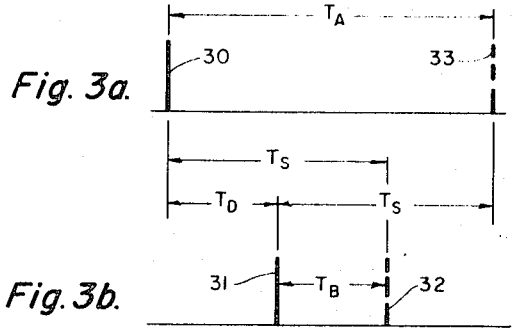
Fig. 3a.
Fig. 3b.
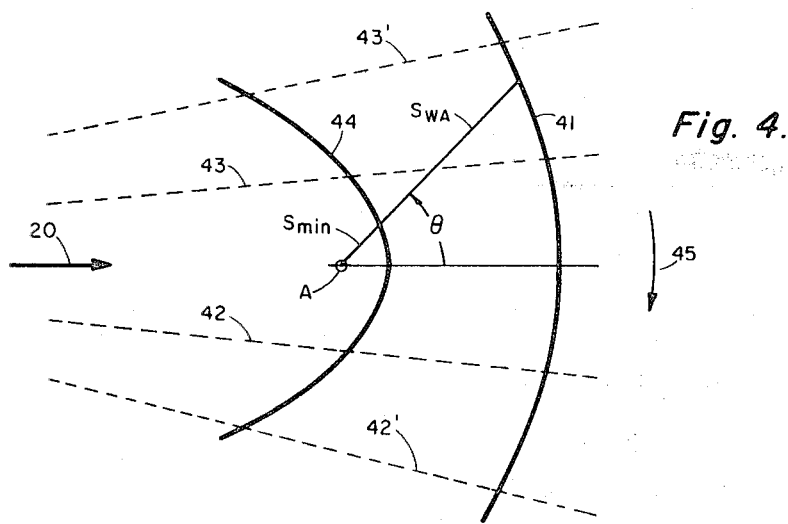
Fig. 4.

PROXIMITY INDICATOR SYSTEMS USING TRANSPONDERS

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND

1. Field

This invention pertains to radio proximity indicating means for mobile craft, particularly for warning of the incipient approach of two such craft to each other in order that timely maneuvers may be made to avoid collision. More generally, the invention relates to apparatus for determining the positions of mobile craft with respect to each other within a radiation field emitted from a reference location.

2. Prior Art

Radiolocation of mobile craft by radar is in use at airports and harbors for traffic control, including the detection of potential collision situations. Major airports are equipped with secondary surveillance radar (SSR) adapted to cooperate with transponder beacons carried on aircraft to discriminate against interference and ground clutter and to provide for transmission of identification and other data such as altitude from the craft to the ground-based radar. A traffic controller observing the radar display directs the pilots of the involved aircraft by radio, usually with voice communication, so as to maintain or restore safe separations between craft.

Such systems, however elaborate and well staffed, are limited in capability because each craft must be dealt with individually and requires its share of the controller's time and attention and its share of the available radio spectrum. When traffic is heavy, takeoffs and landings are delayed, and the possibility of collisions increases.

The number of midair collisions and near misses has become so large in busy areas that numerous interaircraft cooperative proximity warning systems have been proposed. Those more prominently under study or development at this time involve frequent or quasi-continuous exchange of signals between all cooperative aircraft within the region of interest and make no provision for noncooperating craft, except perhaps a need for legislation to exclude them. The required airborne equipment would be bulky and expensive, use more of the already crowded radio spectrum and would be generally independent of other needed and existing equipment, such as transponders. Another drawback of some of the proposed systems is that they provide only relative positional information, without ground reference but in effect with respect to a randomly floating reference.

SUMMARY

According to this invention as applied to proximity monitoring aircraft, the usual aircraft transponder beacon is modified to "listen in" during a brief period after it has received and replied to an interrogation from a ground based SSR, for the replies of any other transponders to interrogations they have received. The interval between one's own reply and the reception of a reply from another craft is related directly both to the difference in the distances of the two from the SSR, and to the distance between the two. If the interval becomes shorter than a certain length, say one hundred microseconds or so, a proximity indicator may be actuated.

At least one, and generally both, aircraft in a proximity situation will be alerted. False alarms are avoided to a large extent because both craft must be illuminated by the directionally scanning beam of the SSR at the same time, i.e., both must be within a beam width of the same direction from the radar. Relatively simple and inexpensive means can be added to the airborne transponder to provide further discrimination against false alarms.

Usually an aircraft in the vicinity of a busy airport is within the service areas of two or more contemporaneously operating SSR stations. Simultaneous or overlapping interrogations of an aircraft by more than one SSR, when they do occur, cannot persist because the radars are scanning independently from different ground locations. Each SSR interrogates the aircraft intermittently to provide a separate signal source for proximity monitoring from a respective different direction, enabling a more detailed and reliable resolution of the positional relationships between aircraft.

All commercial transport aircraft and nearly all other aircraft that utilize major airports are now equipped with transponders. The present invention enables the use of this existing equipment for proximity indication by relatively small and inexpensive additional apparatus, and without interference with the original transponder function or need for more radio spectrum.

The invention is generally applicable to other purposes besides the immediately compelling one outlined above; for example to intercraft positional indication for marine traffic around a harbor or to certain en route operations using repeaters and initiating transmitters at reference locations or obstructions.

BRIEF DESCRIPTION OF THE DRAWINGS

FIG. 1 is a block diagram of a preferred embodiment of the invention.

FIG. 2 is a geometrical diagram showing a typical positional relationship between two craft, and the direction of arrival of an SSR interrogation.

FIGS. 3a and 3b are graphical representations of pulses transmitted and received in the operation of the system of FIG. 1.

FIG. 4 is a polar coordinate graph showing the boundaries of a typical monitored area in the operation of the system of FIG. 1.

DESCRIPTION

Referring to FIG. 1, a transponder 1 of existing type, adapted to be carried aboard an aircraft, is arranged in conventional manner to receive interrogation signals that are transmitted from a ground-based SSR, and to respond by transmitting reply signals intended to be received and utilized by the SSR. The operating characteristics of transponders, and the formats of interrogation and reply signals used with them, are standardized throughout the world. The remainder of the apparatus illustrated in FIG. 1 is to provide proximity information on the aircraft, utilizing only the normal signals the occur in the operation of the usual SSR interrogator and transponder equipments.

A radio receiver 2 is designed to receive the reply signals transmitted by other transponder equipped aircraft. The receiver 2 may be a simple device of the so-called crystal video type. Its sensitivity may be relatively low, as it is intended to receive only the replies of other craft in the general vicinity, say within a distance of 10 to 15 miles. The tuning is fixed at the standard reply carrier frequency, 1,090 MHz.

The receiver 2 is arranged to be timed gated, i.e., alternatively made operative or inoperative in response to control pulses. The gating means could be an internal part of the receiver, but for clarity is shown separately as a switch circuit 3. The switch 3 has input and output terminals, and two control terminals designated respectively "on" and "off." When a pulse is applied to the "on" terminal, the switch provides an electrical path from its input terminal to its output terminal, and continues to do so until a pulse is applied to its "off" terminal. Then it remains off until another pulse is applied to its "on" terminal. By way of example, the switch 3 may comprise a known arrangement of a coincidence circuit or "and" gate controlled by a bistable multivibrator or "flip flop" circuit.

The switch 3 is followed by a similar switch 4, which has its output terminal connected to its own "off" terminal and to a pulse counter 5. The counter 5 is designed to produce a single output pulse in response to the first three of a series of input pulses. The counter 5 may comprise two binary circuits, for example, arranged to operate in the sequence 00, 01, 10, 11 and a coincidence circuit that produces an output pulse in response to the 11 condition. Subsequent input pulses of the same series may produce subsequent output pulses, without effect on the operation of the system. After the end of a series of input pulses, the counter 5 may be reset to zero by application of a pulse to its "reset" terminal.

The output terminal of counter 5 is connected to a manually operable switch 14, shown in its open position. When switch 14 is closed, the output pulse counter 5 is applied to a visual and/or aural indicator device 6, denoted as a proximity indicator. The device 6 is designed to remain on after it is activated for a period of about 1 second, for example, and then go off. The device 6 may comprise a monostable multivibrator arranged to energize any appropriate indicator means, and to deenergize the indicator and provide an output pulse at the end of its period, for resetting the counter 5.

In its normal operation the transponder 1 produces a reply trigger pulse in response to each interrogation. This pulse is used internally to initiate the reply, and is also available or may be made available at an external terminal. This terminal is connected through delay means 7 to the "on" terminal of switch 3, through delay means 8 to the "off" terminal of switch 3, and directly to the "on" terminal of switch 4. Delay means 7 may consist of an ordinary delay line of such length as to provide about 30 microseconds delay. Means 8 is designed to provide about 130 microseconds delay, and may also be a delay line or may be a known type of monostable multivibrator circuit which produces an output pulse at a predetermined time interval following an input pulse.

In the operation of the system of FIG. 1 as thus far described, the transponder 1 will produce a reply trigger pulse in response to each interrogation pulse pair received as the scanning radar beam sweeps past the aircraft. The standard interrogation consists of two half-microsecond pulses separated by specified intervals, on a 1,030 MHz. carrier. A series of about 20 to 30 such pulse pairs is received during each sweep, at intervals of 2 to 5 milliseconds. Each reply trigger pulse initiates a reply transmission from the transponder on a 1,090 MHz. carrier.

The reply includes an initial pulse and another pulse that follows it by 20.3 microseconds. These are called framing pulses. The interval between each pair of framing pulses contains a number of discrete subintervals, in each of which a pulse may or may not be transmitted, depending upon what information is to be contained in the reply.

Twelve such subintervals are available, allowing for possibility of any of 4,096 different binary code groups, each representing one or more pieces of information such as identity, barometric altitude, distress signal, and so on. The desired reply code group may be set in by the operator of the craft using manual code wheel switches that are provided, or in some cases automatically or semiautomatically, for example by pressing a button. One specific example of the latter is the Special Position Identification (SPI) signal normally used in reply to a request from the ground controller for identification. This particular signal is decoded at the SSR ground interrogator and utilized to place a characteristic mark on the radar display adjacent the spot which represents the aircraft that is transmitting the reply, thus identifying that craft with that spot.

The first framing pulse of the reply follows the end of the received interrogation by a standard delay of 3 microseconds, and the second framing pulse is transmitted 23.3 microseconds after the last interrogation pulse. The transponder is then automatically disabled for an interval of about 120 microseconds, called the "dead time."

The reply trigger pulse, which occurs in the 3-microsecond interval between the interrogation and reply, turns switch 4 on. Thirty microseconds later, the delayed trigger from delay means 7 turns switch 3 on. Following the reply trigger after about 130 microseconds, the output of delay means 8 turns switch 3 off. Accordingly, switch 3 is on during a period of about 100 microseconds after each reply transmission of transponder 1, beginning about 10 microseconds after the end of the transmission. This period is termed herein as the "listen-in" period. The beginning and end of the period are given above as specific numerical examples, with the understanding that either or both may be changed or made adjustable.

Any replies received by receiver 2 from another transponder equipped aircraft during a listen-in period are passed through switch 3 to the input of switch 4. The first pulse of such a reply goes through switch 4, immediately turning it off, and also to the pulse counter 5. Any subsequent reply pulses received during that listen-in period are blocked by switch 4, which remains off until it is turned on by the next reply trigger several milliseconds later.

The reception of one pulse during a listen-in period is evidence, not conclusive but credible to some degree, that another nearby aircraft has received and replied to the same interrogation as the one that activated the transponder 1 and caused listen-in to occur. It is possible that the received pulse was fortuitous, as noise, interference, or another's reply to a different SSR in the same general area. The probability of receiving a fortuitous pulse is small because listen-in occurs only during 3 to 5 percent of each interrogation repetition period. The probability of receiving two or more successive replies from another aircraft to another radar is extremely small, because the radar beam rotations are not synchronized, the repetition periods vary, and both aircraft are in motion with respect to both radars.

Suppose for example that the probability of receiving a fortuitous pulse is as much as 10 percent. The probability of receiving two or three within the same beam sweep would be 1 percent and one-tenth percent, respectively. The operation of switch 4 and pulse counter 5 minimizes the possibility of false proximity indications by requiring that three successive reply pulses be received during three successive listen-in periods. Then counter 5 turns on the proximity alarm 6, within a few hundredths of a second after the first reply pulse was received.

Referring to FIGS. 2, 3A and 3B, assume that two aircraft, each equipped with the above-described apparatus, are currently located at points A and B are both receiving interrogation signals that arrive in the direction indicated by the arrow 20 from a radar, not shown in FIG. 2 but located some distance to the left of points A and B. The slant range between A and B is the distance S, and the difference in ranges of A and B from the radar is the distance D. Each interrogation arrives first at A, producing a reply trigger represented by the solid line 30 in FIG. 3A. At an interval $T_D$ thereafter it arrives at B, producing a reply trigger represented by the solid line 13 in FIG. 3B. $T_D$ is the radiation propagation time corresponding to the distance D.

The first pulse of the reply from point A is transmitted with a delay of about 1 microsecond after the reply trigger 30; for the purpose of this discussion the delay may be neglected, and the first pulse transmission considered as substantially coincidental with the trigger. The reply pulse from A is received at B after an interval $T_S$, the radiation propagation time for the distance S. This received pulse is represented by the dash line 32 in FIG. 3B. Similarly, the first pulse of the reply transmitted from B is received at A after an interval $T_S$ following the reply trigger 31, as indicated by the dash line 33 in FIG. 3A.

The total time $T_A$ between the reply trigger 30 and the reception 33 at A of the reply pulse from B is $T_S + T_D$. The interval $T_B$ between the similar pulses 31 and 33 is $T_S - T_D$. Returning to FIG. 2, $\theta$ is the bearing angle from A to B, referred to the direction 20 of wave propagation, and $D\theta S \cos \theta$ Accordingly, $$T_A = \frac{S}{c}(1 + \cos\theta), \text{ and}$$

$$T_B = \frac{S}{c}(1 - \cos\theta),$$

where $c$ is the velocity of propagation, approximately 0.186 mile per microsecond.

Recalling that the listen-in period ends about 130 microseconds after the reply trigger in each case, a proximity indication will be given at A when the slant range becomes less than $$S_{WA} = \frac{130 \times 0.186}{(1 + \cos\theta)}$$

or approximately $$\frac{24}{(1+\cos\theta)} \text{ miles}$$

It is evident that the value of $S_{WA}$, calculated as above, could lie anywhere between 12 miles and infinity, depending upon the bearing angle $\theta$. Referring to FIG. 4, the curve 41 is part of a polar graph of $S_{WA}$ as a function of $\theta$, about point A as the origin.

Two conditions must be met to produce a proximity indication in the aircraft at point A; the other aircraft, point B, must be on or to the left of the curve 41 as viewed in FIG. 4, and the effective beam width of the radar must be sufficient to encompass both points A and B at the same time during a period of at least three interrogation repetition intervals.

The term "effective beam width" is defined as the width, transversely of the beam axis, of the space which the beam illuminates at any given instant with sufficient intensity to trigger a transponder. The effective beam width may be expressed as an angle, in which case it may be typically about 6°, or more or less depending on such factors as the design of the radar antenna and the distance from the radar. The effective beam width may also be expressed in terms of a distance; in a typical case it may be about 10 miles, or more or less, depending somewhat indirectly upon the distance from the radar and other known considerations that need not be discussed in this explanation.

The effective beam width is indicated in FIG. 4 by the distance between the dash line 42 and 43, which represent the effective edges of the beam at an instant when its centerline passes through the point A. These lines and the part of curve 41 between them are three boundaries of a sectoral area within which B must lie in order to meet the above-mentioned two conditions for producing a proximity indication at A, when the beam is centered on A.

A third necessary condition for proximity indication is imposed by the aforementioned 30-microsecond delay between the reply trigger pulse and the start of the listen-in period. This requires that $T_A$ be at least 30 microseconds, and consequently, that the slant range equal or exceed $$S_{\min} = \frac{30 \times 0.186}{(1+\cos\theta)} \text{ miles}$$

or approximately $$\frac{5.6}{(1+\cos\theta)} \text{ miles}$$

The curve 44 in FIG. 4 is part of a polar graph of $S_{min}$ as a function of $\theta$. This is the fourth boundary of the proximity area associated with point A when the beam is in the position indicated by dash lines 42 and 43. In a typical example, this area extends about 10 miles along the beam axis and 10 miles across the axis. In the normal operation of the radar, the beam rotates continuously in azimuth as indicated by arrow 45, illuminating the aircraft at point A from the time the leading edge 42 sweeps past A until the trailing edge 43 arrives. Accordingly, the total area monitored by the equipment at point A is twice the beam width, as indicated by dash lines 42' and 43'.

The foregoing discussion with respect to FIG. 4 tacitly includes the simplifying assumption that both aircraft are at about the same altitude. In practical reality the craft may be at different altitudes, and the slant range between them may have a vertical component. The proximity area illustrated in FIG. 4 is analogous to a section in plan of a three-dimensional space bounded by two ellipsoids, of which curves 41 and 44 are respective elements, and by the effective dimensions of the radar beam in elevation and in azimuth, taking the scanning rotation into account.

Each aircraft equipped as described has a similar proximity monitored space extending above and below and outwardly beyond it from the interrogating ground radar. Another interrogating ground radar will produce another similarly shaped proximity space, oriented similarly with respect to the direction of that radar from the aircraft. If any aircraft enters a space being monitored by another aircraft, an indication will be produced on board the latter. When any two aircraft approach each other within about 10 miles, at least one and ordinarily both will be alerted.

Returning to FIG. 1, the input to the proximity indicator device 6 is also connected by way of line 9 to automatically actuate the SPI reply device in the transponder 1 whenever the proximity indicator is actuated. If the craft is in or near the ground control area of the radar, this reply will designate the corresponding aircraft position indication on the display as if the ground controller had requested identification. The fact that the designation is unique and appears without his request will alert the controller of any radar interrogating the pair to the probability that a proximity exists. Alternatively, another specific pulse coded reply may be selected by convention for this purpose.

The ground control terminal area typically extends to 30 miles or so out from the radar. Ground control en route areas may extend up to 200 miles from the radar. All craft flying within the areas are supposed to be observed by the tower controller or en route center controller, and to follow flight instructions given by controller. Aircraft outside a specified control area nevertheless receive and reply to the interrogations from the respective radars. The signal processing equipment at the radar is usually designed to reject replies from more distant aircraft in a progressive manner as more are received from aircraft within the ground control area. Under heavy local traffic conditions, the ground equipment also tends to become saturated, in the sense of inability to accept and process more replies, but it does continue to transmit interrogations at the same rate regardless of the number of aircraft. All transponder equipped craft reply to the interrogations they receive from all radars within range of the aircraft, whether or not the individual radar is displaying their replies. Thus the proximity indications will be given aboard at least one of the two craft that are involved even when the ground radar is saturated or range limited with regard to them.

When the aircraft that are in such positional relationship as to produce a proximity indication are within a ground control area, the ground controller will instruct one or both of them appropriately, either in response to request from the involved aircraft or to the unsolicited SPI indication appearing on his display. When the aircraft are outside ground control areas, or the ground equipment is saturated with respect to them, it is desirable to designate one of them as the "master" craft, that is, the one to be responsible for making a suitable maneuver, with the understanding that the other will not change course, at least not without notice. To this end, the operator of any craft receiving a proximity indication may simply broadcast the statement that he has the indication and intends to make a certain maneuver. The first to do so is considered the master aircraft. The operator of the other aircraft, if he also has a proximity indication, broadcasts a report of that fact and acknowledges that the craft reported earlier is the master. If he has no proximity indication, he will ordinarily continue his present course long enough to receive one, or long enough to permit the first aircraft to complete suitable action.

The need for interaircraft communication can be materially reduced by providing each craft with an indication of the other's SPI signal, and adopting some simple rules of procedure. The system of FIG. 1 includes for this purpose a decoder 11 similar or identical to the SPI decoder at a ground radar, a three-pulse counter 12 like the counter 5, a manually operable switch 15, and an indicator device 13 like the indicator 6.

The SPI decoder 11 is connected to the output of switch circuit 3, and provides an output pulse to the counter 12 each time an SPI reply is received during the listen-in period. Three such replies produce an output from counter 12. Assuming switch 15, shown in its open position, to be closed, the pulse from counter 12 turns on the SPI indicator 13. The indicator 13 goes off about 1 second after it is turned on and provides an output pulse. This pulse resets counter 12.

The procedural rules may now be as follows:

a. When a craft receives a proximity indication but no SPI indication, that craft is master and remains so until the situation is resolved, even if the SPI indication is later received.
b. When a craft receives an SPI indication but no proximity indication, that craft is in proximity but is not the master and should continue on its present course. The operator is informed by the SPI that he is within the proximity monitored space of another aircraft. A proximity indication received later will not change the status, but simply verify the SPI indication.
c. When both proximity and SPI indications appear simultaneously on one craft, they will also appear on the other. In this case interaircraft communication is necessary, for example as previously described.

Many existing transponders, and others presently contemplated for use in the near future, are designed to include a report of barometric altitude in the coded reply signal. Such reports from other aircraft may be decoded and utilized to prevent exhibition of proximity indications in response to replies from aircraft at substantially different altitudes.

The transponder 1 is supplied with own-craft altitude information as schematically indicated by the dash line arrow 16. An altitude decoder-selector device 17 is provided with the same local input, as indicated by the dash line arrow 18. The device 17 is similar to the apparatus used at the ground radar to decode altitude reports and segregate the replies according to altitude, and is designed in known manner to provide an output pulse whenever a report is received representing an altitude within, say 500 feet of the craft's own altitude. The switch 3 restricts such responses to those received during the craft's listen-in periods.

A switch circuit 19 is connected between the pulse counter 5 and the input terminal of the proximity indicator 6. Switch 19 is arranged as shown to be turned on by the altitude decoder 17 and turned off by the reset pulse from the proximity indicator 6. A similar switch circuit 10 is provided between counter 12 and SPI indicator 13.

When proximity indications are to be restricted to those produced by craft in a selected altitude layer, the switches 14 and 15 are opened as shown. Switch circuits 19 and 10 then operate in response to altitude decoder 17 to bypass the open switches 14 and 15 only if the replies are being received from another aircraft in the selected altitude layer. The own-altitude input 18 to decoder-selector 17 may be varied manually if desired to look for other aircraft above or below one's own altitude. Similarly, either or both delay devices 7 and 8 may be made adjustable to set the horizontal boundaries 41 and 44 (FIG. 4) of the monitored area.

The foregoing description assumes that both aircraft are equipped as illustrated in FIG. 1. It is to be noted that the apparatus will provide useful proximity information with respect to another craft carrying only a standard transponder. Further, it is contemplated that transponders or similar beacon devices could be placed at fixed or reference locations to cooperate with the described equipment, carried on any mobile craft, for navigation and obstruction indication purposes. Certain parts of the system, and their functions, can be omitted. For example the use of the invention for surface vehicles or marine craft would not require altitude segregation. In some applications, the listen-in function alone, without reply, may be preferable. The initiating radiation source may be primary radar, or other transmitter capable of providing identifiable interrogations or equivalent signals.

I claim:

1. A system for detecting the presence of transponders in a localized space in the neighborhood of said system and within the effective beamwidth of a scanning directive radio beam of transmitted interrogation signals, comprising:
    a. a beacon transponder receiver for receiving said interrogation signals and producing time marking signals in the form of reply trigger pulses,
    b. a second receiver means for receiving reply signals transmitted by transponders within said directive beam,
    c. indicator means adapted to be actuated by the output of said second receiver means, and
    d. switch means controlled by said time marking signals to prevent actuation of said indicator means except during a determinable listen-in interval following each said time marking signal.

2. The invention set forth in claim 1, further including the encoder and transmitter portions of a standard beacon transponder, and means for producing a special reply transmission upon actuation of said indicator means.

3. The invention set forth in claim 1, further including means for selecting a special reply signal received by said second receiver means during a listen-in interval, and indicator means coupled thereto for indicating the reception of such reply signal.

* * * * *